United States Patent [19]

Merchant et al.

[11] 4,107,355

[45] Aug. 15, 1978

[54] PROCESS FOR THE PRODUCTION OF HIGHLY HEAT-RESISTANT INSULATING COATINGS ON ELECTRICAL CONDUCTORS

[75] Inventors: Suresh Merchant; Diethard Winkler, both of Wuppertal; Marita Bluhm, Schwelm, all of Fed. Rep. of Germany

[73] Assignee: Dr. Kurt Herberts & Co. Gesellschaft Mit Mit Beschrankter Haftung Vorm. Otto Louis Becker, Wuppertal, Fed. Rep. of Germany

[21] Appl. No.: 811,383

[22] Filed: Jun. 29, 1977

Related U.S. Application Data

[63] Continuation-in-part of Ser. No. 779,001, Mar. 18, 1977, abandoned.

[30] Foreign Application Priority Data

Mar. 25, 1976 [AT] Austria .................................. 2202/76

[51] Int. Cl.$^2$ .......................... C08K 5/06; B05D 5/12; B05D 7/20
[52] U.S. Cl. ................................ 427/120; 427/388 R; 427/388 D; 260/33.2 R
[58] Field of Search ............... 427/120, 388 R, 388 D; 260/33.2 R; 156/51

[56] References Cited

U.S. PATENT DOCUMENTS

| | | | |
|---|---|---|---|
| 2,773,853 | 12/1956 | Weihe | 260/33.2 R |
| 3,502,601 | 3/1970 | Care | 260/33.2 R |
| 3,539,485 | 11/1970 | Gress | 260/33.2 R |
| 3,663,728 | 5/1972 | Hoback | 260/33.2 R |
| 3,914,505 | 10/1975 | Ducloux | 427/388 R |
| 3,931,418 | 6/1976 | Rijken | 427/120 |
| 3,952,084 | 4/1976 | Edelman | 427/388 R |
| 4,012,361 | 3/1977 | Bargain | 260/33.2 R |

*Primary Examiner*—Michael F. Esposito
*Attorney, Agent, or Firm*—Beall & Jeffery

[57] ABSTRACT

This invention relates to a process and composition for the production of highly heat-resistant insulating coatings on electrical conductors by coating the conductors with solutions containing catalysts and, levelling agents of thermosetting amide and/or imide-modified ester resins of polyhydric alcohols, polybasic carboxylic acids containing carboxyl groups attached to aromatic rings, optionally in admixture with aliphatic carboxylic acids and, optionally, their anhydrides and/or esters, and compounds containing amino groups, and heating the coated conductors to object temperatures of 150°–400° C.

14 Claims, No Drawings

PROCESS FOR THE PRODUCTION OF HIGHLY HEAT-RESISTANT INSULATING COATINGS ON ELECTRICAL CONDUCTORS

CROSS-REFERENCE TO RELATED APPLICATION

This application is a continuation-in-part of our earlier application Ser. No. 779,001, filed Mar. 18, 1977 now abandoned.

BACKGROUND OF THE INVENTION

This invention relates to a process and composition for the production of highly heat-resistant insulating coatings on electrical conductors by coating the conductors with solutions containing catalysts and levelling agents of thermosetting amide- and/or imide-modified ester resins of polyhydric alcohols, polybasic carboxylic acids containing carboxyl groups attached to aromatic rings, optionally in admixture with aliphatic carboxylic acids and, optionally, their anhydrides and/or esters, and compounds containing amino groups, and heating the coated conductors to object temperatures above 200° C.

It is known how to produce polyester resins which are suitable for lacquering electrical conductors when dissolved in organic solvents of the phenol, cresol and/or xylenol type. The electrical conductors are insulated by coating them with a solution of the above-mentioned polyester resins, followed by heating at oven temperatures of about 350° C or higher to harden the polyester resins. Conventional lacquer solution generally contain standard lacquer additives and/or hardening catalysts. It is preferred to use lacquer solutions of polyester resins containing 5-membered imide rings in co-condensed form (British Pat. Nos. 939,377; 1,082,181; 1,067,541; 1,067,542 and 1,127,214; Belgian Pat. No. 663,429; French Pat. No. 1,391,834; East German Pat. No. 30,838; German Offenlegungsschrifts Nos. 1,494,454; 1,494,413; 1,937,310; 1,937,311; 1,966,084; 2,101,990 and 2,137,884).

Solvents of the phenol, cresol and/or xylenol type contain phenolic hydroxyl groups. These solvents are extremely undesirable for physiological reasons and, in some countries can only be used under certain conditions. Accordingly, there is a considerable need to avoid the use of these solvents although they are inexpensive and readily obtainable and effectively dissolve the ester resins in question. It is also known to use other solvents, for example N-methyl pyrrolidone, dimethyl acetamide, dimethyl formamide, dimethyl sulphoxide, N-methyl caprolactam and/or dimethyl sulphone (British Pat. No. 1,082,181). Unfortunately, solvents such as these are also physiologically unacceptable, difficult to obtain and hence expensive and/or inadequately dissolve the ester resins so that it is only possible to obtain low-percentage lacquer solutions. Accordingly, the use of these solvents has never acquired any practical significance.

It is also known that insulating coatings can be produced on electrical conductors by coating the conductors with aqueous solutions containing ester resins with carboxyl groups neutralised with bases, especially amines (German Offenlegungsschrifts Nos. 2,509,048; 2,439,385 and 2,439,386). The disadvantage of this process and of the aqueous solutions used therein is that considerable energy is required for evaporating the water during the stoving process, considerable outside energy has to be delivered to the oven, the high surface tension of the water gives rise to difficulties from the lacquering point of view and the acid number of the ester resins containing carboxyl groups has to be very high, for example above about 50, in order to obtain adequate solubility in water after neutralisation. The result of this is that the proportion of amines used for neutralisation has to be high which gives rise to pollution problems. Stability in storage is unsatisfactory on account of hydrolytic degradation processes.

SUMMARY OF THE PRESENT INVENTION

The object of the present invention is to provide a process for the production of insulating coatings on electrical conductors in which solutions of amide- and/or imide-modified ester resins in organic solvents are used, although they are physiologically harmless or considerably less harmful than the conventional solvents referred to above.

It has now surprisingly been found that this object may be achieved by using solvents which, as such, are extremely poor solvents for the amide- and/or imide-modified ester resins normally used, but enable lacquerable solutions with a high stoving residue to be obtained providing the ester resins show a certain ratio of hydroxyl groups to carboxyl groups and have a certain acid number and providing the carboxyl groups are reacted with amines in a certain way.

Accordingly, the present invention relates to a process for the production of highly heat-resistant insulating coatings on electrical conductors by coating the conductors with solutions containing catalysts and levelling agents of thermosetting amide- and/or imide-modified ester resins of polyhydric alcohols, polybasic carboxylic acids containing carboxyl groups attached to aromatic rings, optionally in admixture with aliphatic carboxylic acids and, optionally, their anhydrides and/or esters, and compounds containing amino groups, and heating the coated conductors to object temperatures of 150° to 400° C, preferably 200° to 350° C. The fact that the ester resins have an acid number of from 10 to 50, and the equivalent ratio of hydroxyl groups to carboxyl groups in the starting products for producing the ester resins amounts to between 1.6 and 2.5. The solution contains aliphatic amines in such a quantity that there are from 0.5 to 1.5 amino groups for every free carboxyl group in the ester resin, and at least about 70% by weight of the solvents consists of monoalkyl ethers and/or dialkyl ethers (the alkyl moieties each containing from 1 to 6 carbon atoms) of mono- and/or dialkane diols containing from 2 to 4 carbon atoms per alkane moiety.

The invention also relates to a stoving lacquer containing organic solvents and up to 90% by weight, preferably up to 80% by weight and most preferably up to 70% by weight, thermosetting amide and/or imide-modified ester resins of polyhydric alcohols, polybasic carboxylic acids containing carboxyl groups attached to aromatic rings, optionally in admixture with aliphatic carboxylic acids and, optionally, their anhydrides and/or esters, and compounds containing amino groups, also catalysts and, optionally, standard lacquer additives and/or levelling agents. The ester resins have an acid number of from 10 to 50, and the equivalent ratio of hydroxyl groups to carboxyl groups in the starting products for producing the ester resins amounts to between 1.6 and 2.5. The solution contains aliphatic amines in such a quantity that there are from 0.5 to 1.5 amino groups for every free carboxyl group in the ester resin. The solvents exmployed must be physiologically acceptable and capable of dissolving the aforementioned resins, and examples of such solvents are described hereinbelow. At least about 70% by weight of the total solvent consists of monoalkyl ethers and/or dialkyl ethers (the alkyl moieties each containing from 1 to 6 carbon atoms) of mono- and/or di-alkane diols containing from 2 to 4 carbon atoms per alkane moiety. Free carboxyl groups in the above context are carboxyl groups which are still unesterified after termination of the condensation reaction. The lacquer contains minimum of 30% by weight, preferably 40% and most preferably 50% by weight solids.

The alkyl groups of the above-mentioned mono- or di-alkyl ether groups may be linear or branched and preferably contain from 1 to 4 carbon atoms. The alkane moieties of the dialkane diols preferably each contain 2 carbon atoms. Accordingly, the solvents used in accordance with the invention are preferably monoalkyl ethers and/or dialkyl ethers of mono-ethylene glycol and/or diethylene glycol. Examples of solvents such as these used in accordance with the invention are methyl glycol (monoethylene glycol monomethyl ether), ethyl glycol (monoethylene glycol monoethyl ether), propyl glycol (monoethylene glycol monopropyl ether), butyl glycol (monoethylene glycol monobutyl ether), methyl diglycol (diethylene glycol monomethyl ether), ethyl diglycol (diethylene glycol monoethyl ether), propyl diglycol (diethylene glycol monopropyl ether), butyl diglycol (diethylene glycol monobutyl ether), diethylene glycol dimethyl ether, butyl glycol-tert.-butyl ether, methyl diglycol tert.-butyl ether, monopropylene glycol-1,3-monoethyl ether, monopropylene glycol-1,3-monobutyl ether.

The monoalkyl ethers and/or dialkyl ethers of mono- and/or di-alkane diols used as solvents in accordance with the invention are in themselves extremely poor solvents for the ester resins used. It is surprising that solutions with a high stability in storage, especially against clouding, and a high stoving residue are obtained when ester resins with the above-mentioned ratio of hydroxyl groups to carboxyl groups and with the above-mentioned acid number are used and when the above-defined quantities of certain amines are added to these solutions. The solutions used in accordance with the invention are virtually harmless from the physiological point of view, but in any event are quite considerably less harmful than the solvents hitherto used in this field. They are readily obtainable and hence inexpensive.

As already mentioned, at least about 70% by weight of the solvents present in the solutions according to the invention, based on the total quantity of solvent, consists of the above-defined solvents. The above-defined solvents are preferably present in the solutions according to the invention in a quantity of about 80% by weight and, with particular preference, in a quantity of about 90% by weight. It is of course also possible in accordance with the invention to use only the above-defined solvents. In cases where other solvents are additionally used in amounts of up to 30% by weight of total solvents, they should also be physiologically acceptable in accordance with the general spirit of the invention. Examples of suitable additional solvents are aliphatic alcohols containing from 1 to 8 carbon atoms, such as ethanol, butanol, isopropanol, glycol, diacetone alcohol, benzylalcohol, esters of the type commonly used as lacquer solvents, such as ethyl acetate, butyl acetate, ethyl glycol acetate, ketones of the type commonly used as lacquer solvents, such as butanone and cyclohexanone, xylene, toluene, naphtha and butyrolactone. Cresol type solvents, which have highly objectionable physiological and polluting effects, should be avoided, however. It is best to use additional solvents (also known as co-solvents) of the type which do not adversely affect the lacquering properties of the solutions used and which may even have a favorable effect upon those properties, such as levelling. The lacquer solutions used in accordance with the invention are unaffected by impurities in the form of small quantities of water.

The ester resins used in accordance with the invention have a minimum acid number of preferably about 15 and a maximum acid number of preferably about 25.

As already mentioned, the equivalent ratio of hydroxyl groups to carboxyl groups in the starting products required for producing the ester resins used in accordance with the invention should amount to between 1.6 and 2.5. This equivalent ratio preferably amounts to at least about 1.8. The upper limit is preferably at 2.3.

The carboxy groups used for calculating the equivalent ratio of hydroxyl groups to carboxyl groups in accordance with the above definition are only those (optionally esterified, i.e. potential) carboxyl groups of the carboxylic acids which are still available for an esterification reaction with the alcohols or for an amide-forming reaction with amines used for this purpose. Accordingly, the amide-imide-modified ester resins are produced by esterifying the above-mentioned polybasic carboxylic acids with polyhydric alcohols. In this connection, it is also possible to produce heterocyclic carboxylic acids, for example diimide dicarboxylic acids, to be preformed and to esterify these diimide dicarboxylic acids with the alcohols in a single stage using one and the same vessel, because the amino groups react preferentially with the carboxyl groups in the ortho position or their anhydride groups, for example in trimellitic acid or its anhydride, to form five-membered imide rings, so that only those carboxyl groups of the originally used carboxlic acid or its anhydride which do not react with amino groups to form five-membered imide rings are left over for the esterification reaction with the alcohols.

Examples of carboxylic acids which may be used for producing the ester resins are terephthalic acid, isophthalic acid, trimellitic acid, pyromellitic acid, their esters or anhydrides.

Other suitable polyfunctional compounds for polyester formation are polyfunctional carboxylic acids, alcohols or compounds containing amino groups of the type which already contain five-membered imide rings. Examples of polyfunctional compounds such as these are the polybasic carboxylic acids obtained by reacting, for example, trimellitic acid anhydride with diamine to form so-called diimide dicarboxylic acids. The polybasic carboxylic acids which are esterified with the alcohols may therefore represent relatively complicated molecules.

The amines which may be reacted with the carboxyl groups available for the esterification reaction to form acid amide bonds are aliphatic or aromatic compounds, as in the prior art. Examples of these amines are ethanolamine, ethylene diamine, aminomethylol propane, p- aminobenzyl alcohol, 4,4'-diaminodiphenyl methane, ether and/or sulphone.

The ester imide resins may with advantage contain up to 5% by weight of nitrogen bound in five-membered imide rings.

According to the invention, it is preferred to use for producing the ester resins carboxylic acids, alcohols and/or amino-group-contaning compounds of the type which are at least partly polyfunctional, i.e. more than bi-functional, in order to obtain products crosslinked on the wire during the stoving process. The degree of crosslinking corresponds to the amide- and/or imide-modified ester resins normally used in this technical field. As in the prior art, the above-mentioned polyfunctional carboxylic acids, alcohols and/or compounds containing amino groups preferably contain 3 or 4 and, with particular preference, 3 carboxyl groups, hydroxyl groups and/or amino groups in the molecule.

The reaction between carboxylic acids, alcohols and compounds containing amino groups to produce the ester resins used in accordance with the invention is over when the required acid number is reached. However, it is also possible to produce ester resins with, at first, a relatively low acid number and to produce resins with the required acid number by reacting these ester resins with polybasic carboxylic acids.

Conventional esterification catalysts may be used in the production of the ester resins from carboxylic acids, alcohols and, optionally, compounds containing amino groups. Examples of suitable esterification catalysts are zinc acetate, antimony trioxide, metal amine complex catalysts, such as the complex compounds described in German Auslegeschrift No. 1,519,372, litharge, tin-(II)oxalate, titanates, manganese(II) acetate, cerium(III-)acetate and others.

On completion of the esterification reaction, the ester resins are cooled to a temperature below the boiling point of the amines which are added to the solutions in accordance with the invention. These amines are then slowly added. Suitable aliphatic amines are primary, secondary, and tertiary monoamines. It is preferred to use alkanol amines preferably containing one nitrogen atom optionally bonded to 1-3 alkanol or alkyl groups, the alkanol or alkyl groups preferably containing from 1 to 6 and, with particular preference, from 1 to 4 carbon atoms in the chain. Examples are monoethanolamine, diethanolamine, triethanolamine, N,N-dimethyl ethanolamine, N,N-diethyl ethanolamine, propanolamine, diisopropanolamine.

The solution preferably contains the aliphatic amines in such a quantity that there are at least about 0.8 amino groups for every carboxyl group in the ester resin. The upper limit to the quantity of amines added is preferably such that there is about one amino group to every carboxyl group.

In addition, these amines have an accelerating effect upon the transesterification reaction which takes place during stoving on the wire. This applies in particular to amines of the type which only escape from the lacquer film after evaporation of the solvents.

The solution is then diluted to the required concentration with the solvents used in accordance with the invention. The catalysts, levelling agents and, optionally, other lacquer additives normally used for stoving purposes are then added to the solutions. In the context of the invention, lacquer additives also include optionally masked isocyanates. It is known that ester resins may be used in combination with optionally masked isocyanates in the production of insulating coatings on electrical conductors. This modification is covered by the present invention. For reasons of physiological acceptability, it is preferred to use masked isocyanates of the type whose masking agents are harmless or substantially harmless from the physiological point of view.

As in cases where conventional solvent-containing lacquers are used, crosslinking on the wire takes place at object temperatures of about 150°–400° C, preferably 200°–350° C, i.e. at oven temperatures of 350° C to 650° C, with the object temperature being lower due to the speed of travel of the wire through the oven. The upper temperature limit is essentially determined by the obvious need to avoid decomposition of the uniform coating on the wire. As is standard practice in the prior art, so-called stoving catalysts may be added to the solutions for stoving. Examples of suitable stoving catalysts are monomeric or polymeric aryl or alkyl titanates, orthotitanic acid esterchellate compounds and other conventional transesterification catalysts. They may be suitably selected by the expert and used in appropriate concentration (for example from 0.001 to 8% by weight, based on the solution). It is only possible to use stoving catalysts of the type which are homogeneously miscible in the solution used. Additives, such as silicone-containing levelling agents (for example 0.001 to 5.0% by weight), are often useful and may be added in accordance with the prior art for improving the lacquering behaviour of the stoving lacquer.

In cases where solvent-containing lacquer solutions are used, as in the prior art, several thin layers are successively formed on the wire and separately stoved in order ultimately to obtain a multilayer coating with optimal insulating and mechanical properties. The lacquer coatings obtained after each individual stoving operation have layer thicknesses of, for example, from 5 to 15$\mu$, depending upon the diameter of the nozzle or die, and a maximum layer thickness of about 20$\mu$ for a wire diameter of 1 mm.

The process according to the invention may be applied with particular advantage to ester resins of the type which have a high tris-(2-hydroxyethyl)-isocyanurate content. For example, this compound is added in such a quantity that it makes up about 30 to 50% of the total number of hydroxyl groups used with the starting compounds. The process according to the invention may also be applied with advantage to ester resins of the type which have a relatively high content of five-membered imide rings, for example in such a quantity that the ester resins contain more than 1% by weight of nitrogen in the form of five-membered imide rings and, optionally, amide bonds as well.

EXAMPLE 1

248 g (4.0 moles) of ethylene glycol, 392 g (1.5 moles) of tris-(2-hydroxyethyl)-isocyanurate and 388 g (2.0 moles) of terephthalic acid dimethyl ester are reacted together with 1.6 g of zinc acetate in a three-necked flask, provided with a stirrer, thermometer and rectification column, at a temperature of up to 200° C. 128 g of methanol are distilled off. After cooling to approximately 150° C, 192 g (1.0 mole) of trimellitic acid anhydride and 99 g (0.5 mole) of 4,4'-diaminodiphenyl methane are added. 35 g of water are distilled off by further heating to 210° C. Another 192 g (1.0 mole) of trimellitic acid anhydride and another 99 g (0.5 mole) of 4,4'-diaminodiphenyl methane are added to the melt cooled to 150° C. At 210° C, water is distilled off until the acid number amounts to 19. After cooling to 130° C, a total of 43 g of N,N-dimethyl ethanolamine is added in portions over a period of 15 minutes. (There is about one amino group to every free carboxyl group in the ester resin).

500 g of the above material are dissolved in 150 g of diglycol dimethyl ether, 150 g of ethyl diglycol, 120 g of ethyl glycol and 50 g of butyl diglycol, followed by the addition of 30 g of titanium acetyl acetonate (catalyst). A clear lacquer with a stoving residue (1 hour at 180° C) of 49% and a flow-out consistency $AK_4^{20}$ of 145 seconds is formed.

In a parallel test in which no N,N-dimethyl ethanolamine is added, the lacquer solution obtained is cloudy and cannot be processed.

EXAMPLE 2

496 g (8.0 moles) of ethylene glycol, 114 g (1.5 moles) of propylene glycol and 388 g (2.0 moles) of terephthalic acid dimethyl ester are reacted in the presence of 1.4 g of zinc acetate in the same way as described in Example 1. 128 g of methanol are distilled off. After cooling to 150° C, 336 g (1.75 moles) of trimellitic acid anhydride and 99 g (0.5 mole) of 4,4'-diaminodiphenyl methane are added. The melt is then heated until 60 g of water have distilled off. After cooling to 150° C, another 336 g (1.75 moles) of trimellitic acid anhydride and another 99 g (0.5 mole) of 4,4'-diaminodiphenyl methane are added to the melt. At 220° C, water is distilled off until the acid number amounts to 25. After cooling to 130° C, a total of 65 g of N,N-dimethyl ethanolamine is added in portions over a period of 15 minutes. (There is about one amino group for every free carboxyl group).

500 g of this material are dissolved in 150 g of diglycol dimethyl ether, 250 g of ethyl diglycol and 120 g of butyl diglycol, followed by the addition of 30 g of polymeric butyl titanate. The clear lacquer solution has a stoving residue (1 h at 180° C) of 45% and a flow-out consistency $AK_4^{20}$ of 105 seconds.

In a parallel test, in which no N,N-dimethyl ethanolamine is added, the lacquer solution obtained is cloudy and cannot be processed.

EXAMPLE 3

394 g (6.35 moles) of ethylene glycol, 496 g (1.9 moles) of tris-(2-hydroxyethyl)-isocyanaurate and 776 g (4.0 moles) of terephthalic acid dimethyl ester are reacted in the presence of 5.0 g of monomeric butyl titanate in the same way as described in Example 1. 250 g of methanol are distilled off. After cooling to 150° C, 192 g (1.0 mole) of trimellitic acid anhydride and 178 g (0.9 mole) of 4,4'-diaminodiphenyl methane are added, followed by heating until 35 g of water have distilled off. After cooling to 150° C, another 192 g (1.0 mole) of trimellitic acid anhydride and 178 g (0.9 mole) of 4,4'-diaminodiphenyl methane are added to the melt. At 210° C, water is distilled off until the acid number amounts to 18. After cooling to 130° C, 73 g of diethanolamine are added to the melt. (There is about one amino group for every free carboxyl group).

500 g of this material are dissolved in 300 g of ethyl diglycol, 100 g of ethyl glycol and 120 g of butyl diglycol, followed by the addition of 20 g of titanium acetyl acetonate. The clear lacquer solution has a stoving residue (1 h at 180° C) of 47.5% and a flow-out consistency $AK_4^{20}$ of 130 seconds.

In a parallel test, in which no diethanolamine is added, the lacquer solution obtained is cloudy and cannot be processed.

EXAMPLE 4

15.95 kg (209.9 moles) of 1,2-propylene glycol, 16.10 kg (61.7 moles) of tris-(2-hydroxyethyl)-isocyanurate and 19.88 kg (119.8 moles) of isophthalic acid are reacted in the presence of 70 g of zinc acetate in a 120 liter industrial reactor, equipped with an anchor stirrer, induction heating (temperature control) and rectification column, at a temperature of up to 200° C. 2.1 kg of water distill off. After cooling to 150° C, 12.07 kg (62.9 moles) of trimellitic acid anhydride and 5.93 kg (29.9 moles) of 4,4'-diaminodiphenyl methane are added. By further heating to 200° C, water is distilled off until the acid number amounts to 25. After cooling to 130° C, 2.30 kg of N,N-dimethyl ethanolamine are slowly added. (There are about 0.9 amino groups for every free carboxyl group).

8.00 kg of the above material are dissolved in 7.00 kg of ethyl diglycol, 1.00 kg of methyl diglycol and 0.50 kg of butyl diglycol, followed by the addition of 0.27 kg of titanium acetyl acetate. The clear lacquer obtained has a stoving residue (1 h at 180° C) of 46% and a flow-out consistency $AK_4^{20}$ of 105 seconds.

A sample taken before the addition of N,N-dimethyl ethanolamine does not form a clear solution in the solvents used.

EXAMPLES 5 to 9

The ester resins of Examples 5 to 9 are prepared in the same way as described in Example 1. The lacquers are prepared according to the recipe given in Example 1.

EXAMPLE 5

238 g (3.84 moles) of ethylene glycol
515 g (1.97 moles) of tris-(2-hydroxyethyl)-isocyanurate
55 g (0.33 mole) of isophthalic acid
388 g (2.00 moles) of terephthalic acid dimethyl ester
400 g (2.01 moles) of trimellitic acid anhydride
198 g (1.00 mole) of 4,4'-diaminodiphenylmethane
7 g of zinc acetate The ester resin has an acid number of 18. 40 g of N,N-dimethyl ethanolamine are added so that there are 0.88 amino groups for every free carboxyl group.

EXAMPLE 6

326 g (5.26 moles) of ethylene glycol
922 g (3.53 moles) of tris-(2-hydroxyethyl)-isocyanurate
607 g (3.13 moles) of terephthalic acid dimethyl ester
787 g (4.10 moles) of trimellitic acid anhydride
396 g (2.00 moles) of 4,4'-diaminodiphenyl methane
18 g of zinc acetate The ester resin has an acid number of 23. 95 g of N,N-dimethyl ethanolamine are added so that there are 0.96 amino groups for every free carboxyl group.

EXAMPLE 7

286 g (4.61 moles) of ethylene glycol
731 g (2.80 moles) of tris-(2-hydroxyethyl)-isocyanurate
166 g (1.00 mole) of isophthalic acid
243 g (1.25 moles) of terephthalic acid dimethyl ester
595 g (3.10 moles) of trimellitic acid anhydride 297 g (1.50 moles) of 4,4'-diaminodiphenyl methane
7 g of zinc acetate
4 g of antimony trioxide The ester resins have an acid number of 20. 70 g of N,N-dimethyl ethanolamine are added so that there are 1.05 amino groups for every free carboxyl group.

EXAMPLE 8

620 g (10.00 moles) of ethylene glycol
104 g (1.00 mole) of neopentyl glycol
1566 g (6.00 moles) of tris-(2-hydroxyethyl)-isocyanurate
415 g (2.50 moles) of isophthalic acid
970 g (5.00 moles) of terephthalic acid dimethyl ester
960 g (5.00 moles) of trimellitic acid anhydride
495 g (2.50 moles) of 4,4'-diaminodiphenyl methane
20 g of zinc acetate The ester resins have an acid number of 19. 151 g of N,N-diethyl ethanolamine are added so that there are 0.84 amino groups for every free carboxyl group.

EXAMPLE 9

495 g (7.98 moles) of ethylene glycol
1466 g (5.62 moles) of tris-(2-hydroxyethyl)-isocyanurate
427 g (2.57 moles) of isophthalic acid
582 g (3.00 moles) of terephthalic acid dimethyl ester
1152 g (6.00 moles) of trimellitic acid anhydride
634 g (3.20 moles) of 4,4'-diaminodiphenyl methane
25 g of zinc acetate
5 g of cerium(III)acetate The ester resin has an acid number of 25. 160 g of N,N-dimethyl ethanolamine are added so that there are 0.92 amino groups for every free carboxyl group.

Using a horizontal wire lacquering furnace approximately 3 meters long with a temperature of 550° C, the lacquer solutions are applied in eight layers from nozzles to a 0.5 mm diameter copper wire and hardened. In Examples 1 to 9, the lacquering speed amounts to between 38 and 40 meters per minute.

The tests were carried out as follows:

1. Winding strength with pre-elongation: a piece of wire is pre-elongated by the percentage amount indicated and wound around a mandrel with the same diameter as the wire under test. The insulated conductor is then examined for cracks in the lacquer layer. If no cracks are found, the tested wire is in order (i.O.). The degree of pre-elongation at which the wire is still in order is quoted. The test conditions are described in detail in DIN 46453, Section 5.1.2 — Sheet 1.

2. Heat shock test (30 minutes at 160° C): the wire is wound around a mandrel with the same diameter as the wire to form a coil which is then kept in a furnace for 30 minutes at 160° C and assessed in the same way as in test 1. The test conditions are described in detail in DIN 46453, Sheet 1, Section 5.2.1.

The test at 180° C and at 200° C is carried out in the same way, except that the oven is of course kept at 180° C and at 200° C.

3. Softening point in ° C according to DIN 46453, Sheet 1, Section 5.2 2.: the softening point is the temperature at which two wires which are arranged crosswise over one another, weighted with standard weights and subjected to an increasing temperature are short-circuited.

4. Stoving residue: 1 g of lacquer solution is stoved for 1 hour at 180° C in a 50 mm diameter cover. The residue left is quoted in %.

5. Flow-out consistency $AK_4^{20}$: the flow-out consistency is the period of time in sections which the lacquer solution takes to flow out of a DIN-4 cup, as determined at 20° C in accordance with DIN 53211 (April, 1974).

Table 1

| Lacquer according to Example No. | 1 | 2 | 3 | 4 | 5 | 6 | 7 | 8 | 9 |
|---|---|---|---|---|---|---|---|---|---|
| Testing of the insulated wires produced the following results: | | | | | | | | | |
| Appearance of the lacquer solutions | clear | clear | clear | clear | clear | clear | clear | clear | clear |
| Lacquer surface | i.O. | i.O. | i.O. | i.O. | i.O. | i.O. | i.O. | i.O. | i.O. |
| Lacquer coating in μm DIN 46 453 | 65 | 60 | 65 | 65 | 60 | 70 | 65 | 65 | 60 |
| Winding strength of the wire wound around its own diameter after pre-elongation | 30% | 20% | 20% | 25% | 20% | 25% | 25–30% | 25% | 20–25% |
| Heat schock test | | | | | | | | | |
| 30 mins. at 160° C | i.O. | i.O. | i.O. | i.O. | i.O. | i.O. | i.O. | i.O. | i.O. |
| 30 mins. at 180° C | i.O. | i.O. | i.O. | i.O. | i.O. | i.O. | i.O. | i.O. | i.O. |
| 30 mins. at 200° C | i.O. | n.i.O. | n.i.O. | n.i.O. | n.i.O. | i.O. | i.O. | n.i.O. | i.O. |
| Softening point DIN 46 453 Sheet 1 Section 5.22 | 373° C | 305° C | 342° C | 325° C | 360° C | 373° C | 378° C | 368° C | 372° C | i.O. = in order
n.i.O. = not in order

We claim:

1. A process for the production of highly heat resistant insulating coatings on electrical conductor wires which comprises:
   (a) coating the electrical conductor wire with a solution comprising a physiologically acceptable organic solvent and 30 to 90% by weight of an amide and/or imide-modified ester resin of polyhydric alcohols, polybasic carboxylic acids containing carboxyl groups attached to the aromatic rings, wherein said ester resins have an acid number of from 10 to 50 and the equivalent ratio of hydroxyl groups to carboxyl groups in the starting products for producing the ester resin is between 1.6 and 2.5, the solution contains aliphatic amines in such a quantity that there are from 0.5 to 1.5 amino groups for every free carboxyl group in the ester resin, and at least about 70% by weight of the total solvent consists of monoalkyl ethers and/or dialkyl ethers of mono- and/or dialkane diols containing from 2 to 4 carbon atoms per alkane moity, the alkyl moities of said dialkyl ethers each containing 1 to 6 carbon atoms; and (b) heating said coated conductor wire to a temperature of 150°–400° C.

2. A process as claimed in claim 1, wherein the equivalent ratio of hydroxyl groups to carboxyl groups amounts to at least about 1.8.

3. A process as claimed in claim 1, wherein the equivalent ratio of hydroxyl groups to carboxyl groups amounts to at most 2.3.

4. A process as claimed in claim 1, wherein the ester resins have an acid number of at least about 15.

5. A process as claimed in claim 1, wherein the ester resins have an acid number of at most about 25.

6. A process as claimed in claim 1, wherein the solution contains aliphatic amines in such a quantity that there are at least about 0.8 amino groups for every carboxyl group in the ester resin.

7. A process as claimed in claim 1, wherein the solution contains aliphatic amines in such a quantity that there is at most about one amino group for every carboxyl group in the ester resin.

8. A process as claimed in claim 1, wherein the solution contains aliphatic monoamines.

9. A process as claimed in claim 1, wherein the solution contains alkanolamines which may contain N-alkyl groups.

10. A stoving lacquer comprising a physiological acceptable organic solvent and 30 to 90% by weight of a thermosetting amide and/or imide-modified ester resins of polyhydric alcohols, polybasic carboxylic acids containing carboxylic groups attached to aromatic rings, wherein the ester resins have an acid number of from 10 to 50 and the equivalent ratio of hydroxyl groups to carboxyl groups in the starting products for producing the ester resins amounts to between 1.6 and 2.5, the solution contains aliphatic amines in such a quantity that there are from 0.5 to 1.5 amino groups for every free carboxyl group in the ester resin, and at least about 70% by weight of the total solvent consists of mono- and/or di-alkyl ethers of mono- and/or di-alkane diols containing from 2 to 4 carbon atoms per alkane moiety, the alkyl moieties of said ethers each containing 1-6 carbon atoms.

11. The lacquer of claim 10 wherein said ester resins are in admixture with aliphatic carboxylic acids.

12. The lacquer of claim 10 wherein said ester resins are in admixture with the anhydrides and/or esters of aliphatic carboxylic acids and amino group containing compounds.

13. The lacquer of claim 10 which additionally contains catalysts, lacquer additives and/or levelling agents.

14. The lacquer of claim 10 wherein said solvent is present in amounts of 80–90% by weight and is one or more compounds selected from the group consisting of monoalkyl ethers of mono-ethylene glycol of diethylene glycol and dialkyl ethers of mono-thylene glycol or diethylene glycol.

* * * * *